United States Patent Office 3,140,759
Patented July 14, 1964

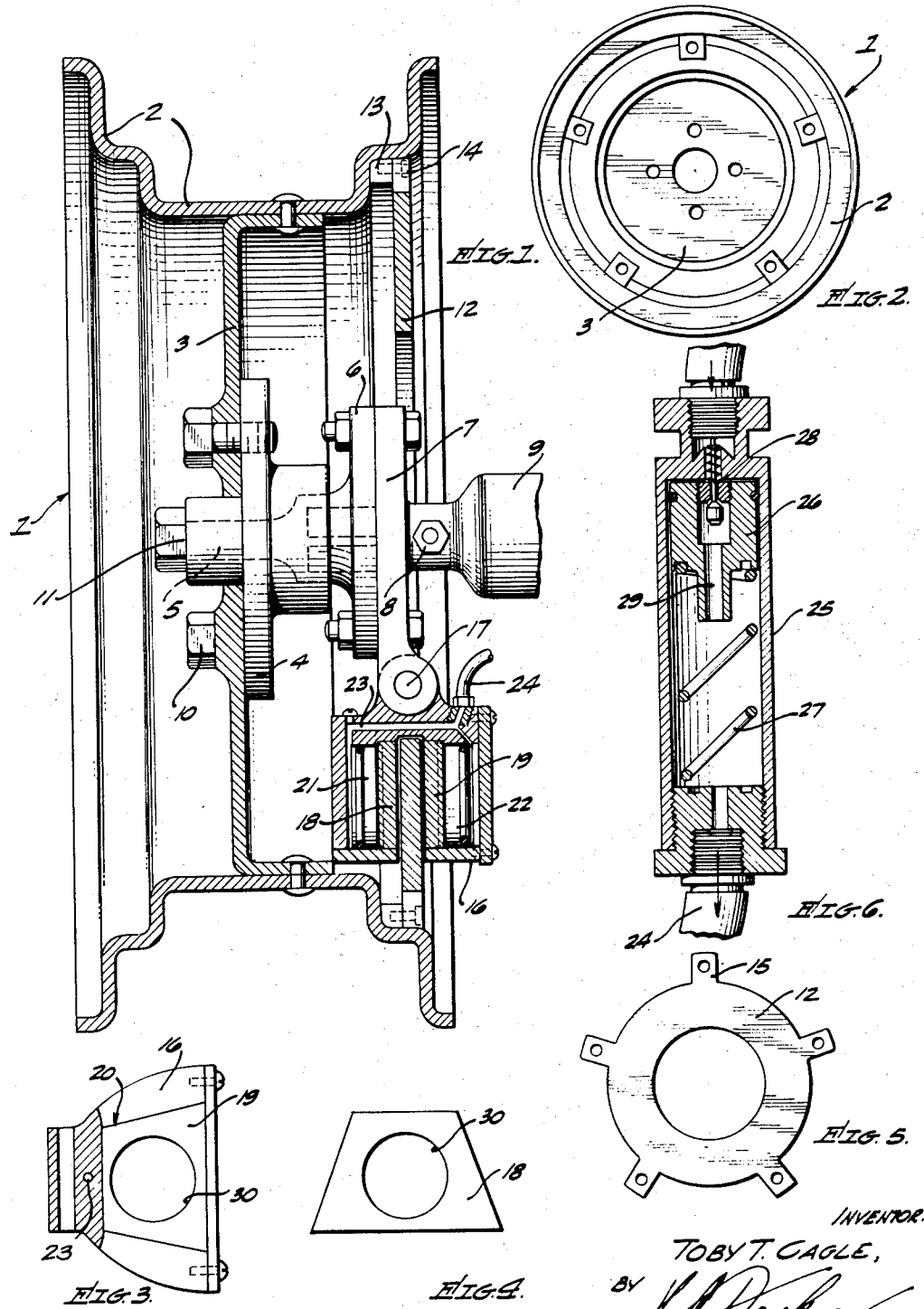

3,140,759
PIVOTED SPOT TYPE DISK BRAKE
Toby T. Cagle, 13403 Stanbridge, Bellflower, Calif.
Filed May 22, 1961, Ser. No. 111,562
6 Claims. (Cl. 188—73)

This invention relates to a disk brake, particularly applicable to vehicles of different types, and is directed to a type of disk brake where hydraulic pressure is used to activate the brake shoes which engage the disk.

An object of my invention is to provide a novel disk brake of the single disk type, in which the disk engaging shoes or blocks are mounted in a member which can pivot about an axis to permit removal of the wheel on which the disk is mounted.

Still another object of my invention is to provide a novel disk type brake in which the single brake disk is attached directly to the wheel for the purpose of strengthening the entire assembly, and also to eliminate parts which are required on other types of disk brakes.

Still another object of my invention is to provide a novel disk brake of the character stated, which will permit the brake shoes or blocks to be quickly and easily replaced when they become worn.

Still another object is to provide a novel disk brake in which the single disk is so mounted that it will be effectively cooled when in operation on a vehicle.

A feature of my invention is to provide a novel disk brake which will not fade under prolonged use, and which has an effective braking action.

Still another object is to provide a novel actuating unit in connection with the disk brake which will permit the brake shoes or blocks to be retracted without the use of a spring engaging those shoes or blocks.

Other objects, advantages and features of invention may appear from the accompanying drawing, the subjoined detailed description and the appended claims.

In the drawing

FIGURE 1 is a transverse sectional view of my disk type brake mounted on a wheel.

FIGURE 2 is a side elevation of the vehicle wheel on which the disk brake is mounted.

FIGURE 3 is a vertical sectional view of the brake shoe housing.

FIGURE 4 is a side elevation of one of the brake shoes.

FIGURE 5 is a side elevation of the single disk.

FIGURE 6 is a longitudinal sectional view of the brake actuator.

Referring more particularly to the drawing, the numeral 1 indicates a vehicle wheel which includes the rim 2 and the spoke section 3. The spoke section in a modern metal wheel is a solid structure, and in this instance the spoke portion is bolted to a hub 4 which carries the usual bearings if the structure is a front wheel, and suitable keys and the like if the wheel is positioned at the rear of the vehicle. I have here illustrated a front wheel structure in which the numeral 5 indicates the spindle upon which the wheel is mounted. This spindle includes a flange or ring 6 adjacent its inner end, and this ring is bolted to the flange 7, which is an integral part of the usual pivotal yoke structure of a front wheel assembly. The usual kingpin 8 extends through the flange structure 7 and pivots that structure on the A-frame 9, which is again part of the usual front wheel assembly. On a rear wheel assembly, which is not shown, the flange 7 would be attached to the drive shaft housing, or might be an integral part thereof. The studs or bolts 10 extend through the spoke portion 3 of the wheel into the hub 4, and these bolts or studs are removed when the wheel is to be replaced. The hub 4 is held in position on the spindle 5 by the usual mounting bolt 11 which screws onto the outer end of the spindle 5 and bears against the hub 4.

The brake disk 12 is fixedly attached to the inside of the wheel 1 and preferably directly to the rim 2 in the following manner: A plurality of spaced lugs 13 are welded or otherwise fixedly mounted on the inner face of the rim 2. These lugs are drilled and tapped to receive the mounting studs 14 which pass through the outwardly projecting lugs 15 on the disk 12 and thence into the lugs 13. Thus the disk 12 is fixedly secured directly to the rim 2 of the wheel and is not inclosed by any brake structure, but is open to the free circulation of air for cooling purposes. The disk 12 is preferably ring-shaped so as to fit around the flanges 6 and 7.

A brake shoe housing 16 is pivotally mounted on the flange 7 by means of the pivot pin 17, which extends through the flange 7 and one end of the housing 16. A pair of brake shoes 18–19 are mounted within the housing 16 and are positioned one on each side of the disk 12. The brake shoes or blocks 18–19 are preferably tapered and fit into a tapered seat 20 in the housing 16. To press the blocks 18 and 19 against the disk 12, I provide two pistons 21 and 22 which are mounted within the housing 16 and bear respectively against the outer surfaces of the blocks 18 and 19. When pressure is exerted against the pistons 21 and 22 these pistons press the blocks 18 and 19 against the inner and outer faces of the disk 12, thus creating a braking action required to stop the vehicle. The housing 16 has a vertically extending opening or slot therethrough through which the disk 12 passes. Thus the disk 12 is positioned between the brake shoes or blocks 18 and 19, as shown in FIG. 1.

The brake shoes 18 and 19 are operated hydraulically by hydraulic pressure against the pistons 21 and 22 in the following manner: Fluid ducts 23 are provided in the housing 16, and these ducts extend to the outer faces of both pistons 21 and 22. A flexible hydraulic hose 24 extends from an actuator 25 to the duct 23 in the housing 16. The actuator 25 has a piston 26 slidably mounted therein, and this piston is urged upwardly by the coil spring 27 within the actuator. A "Schrader" type check valve 28 is mounted in the piston 26 and this valve is preferably the usual tire valve type which acts as a check valve, permitting passage of fluid in only one direction. The piston 26 is drilled longitudinally, as shown at 29, to permit fluid to pass therethrough when the valve 28 is open. Hydraulic pressure from the brake master cylinder (not shown) will first move the piston 26 downwardly against the tension of the spring 27. Thereafter, as pressure builds up the check valve 28 will open, permitting fluid pressure to pass through the actuator 25 into the hose or pipe 24, and thence into the duct 23, where pressure is exerted against the pistons 21 and 22 to press the brake shoes 18–19 against the disk 12. When pressure is taken off of the foot pedal, which reduces the hydraulic pressure to the actuator 25, the piston 26 will be forced upwardly in the actuator by the spring 27, thus causing a partial vacuum in the pipe 24. This partial vacuum will withdraw the pistons 21 and 22, as well as the blocks 18 and 19, thus preventing drag of these blocks against the disk 12 when the brake is not being applied. The pistons 21 and 22 preferably fit into a shallow recess 30 in the block 18 or 19, thus providing a close fitting connection between the pistons and the brake shoes or blocks, so that these blocks will be retracted with the pistons when a partial vacuum occurs in the line 24.

Having described my invention, I claim:

1. A disk brake for the wheels of a vehicle, comprising a disk, means fixedly securing the disk to said wheel, a non-rotatable flange positioned adjacent the wheel, a brake shoe housing, means perpendicular to the axis of the wheel pivotally mounting the brake shoe housing on said flange, said brake shoe housing being bifurcated such that it straddles the disk, a pair of brake shoes in said housing positioned one on each side of said disk and engageable with the disk, a piston in the housing bearing against each of said brake shoes, said brake shoe housing having a duct therein extending to one side of each of said pistons, and a hydraulic hose extending to said duct to conduct pressure fluid to the pistons to press the pistons against the brake shoes.

2. A disk brake for the wheels of a vehicle, comprising a disk, a plurality of spaced lugs on the rim of the wheel, said disk being bolted to the lugs, a nonrotatable flange positioned adjacent the wheel, a brake shoe housing, means perpendicular to the axis of the wheel pivotally mounting the brake shoe housing on said flange, said brake shoe housing being bifurcated such that it straddles the disk, a pair of brake shoes in said housing positioned one on each side of said disk and engageable with the disk, a piston in the housing bearing against each of said brake shoes, said brake shoe housing having a duct therein extending to one side of each of said pistons, and a hydraulic hose extending to said duct to conduct pressure fluid to the pistons and press the pistons against the brake shoes.

3. A disk brake for the wheels of a vehicle, comprising a disk, means fixedly securing the disk to said wheel, a nonrotatable flange positioned adjacent the wheel, a brake shoe housing, means perpendicular to the axis of the wheel pivotally mounting the brake shoe housing on said flange, said brake shoe housing being bifurcated such that it straddles the disk, a pair of brake shoes in said housing positioned one on each side of said disk and engageable with the disk, a piston in the housing bearing against each of said brake shoes, said brake shoe housing having a duct therein extending to one side of each of said pistons, and a hydraulic hose extending to said duct to conduct pressure fluid to the pistons to press the pistons against the brake shoes, a hydraulic actuator cylinder to control said pistons, said hose extending from one end of the actuator cylinder, a piston slidably mounted in the actuator cylinder, a check valve in the piston, a spring bearing against the piston and urging the piston in one direction in the actuator cylinder to create a partial vacuum within the actuator cylinder when the piston moves under pressure of the spring and opposite to the pressure of hydraulic fluid in the actuator cylinder.

4. A disk brake for the wheels of a vehicle, comprising a disk, a plurality of spaced lugs on the rim of the wheel, said disk being bolted to the lugs, a nonrotatable flange positioned adjacent the wheel, a brake shoe housing, means perpendicular to the axis of the wheel pivotally mounting the brake shoe housing on said flange, said brake shoe housing being bifurcated such that it straddles the disk, a pair of brake shoes in said housing positioned one on each side of said disk and engageable with the disk, a piston in the housing bearing against each of said brake shoes, said brake shoe housing having a duct therein extending to one side of each of said pistons, and a hydraulic hose extending to said duct to conduct pressure fluid to the pistons and press the pistons against the brake shoes, a hydraulic actuator cylinder to control said pistons, said hose extending from one end of the actuator cylinder, a piston slidably mounted in the actuator cylinder, a check valve in the piston, a spring bearing against the piston and urging the piston in one direction in the actuator cylinder to create a partial vacuum within the actuator cylinder when the piston moves under pressure of the spring and opposite to the pressure of hydraulic fluid in the actuator cylinder.

5. A disk brake for the wheels of a vehicle, comprising a disk, means fixedly securing the disk to said wheel, a nonrotatable flange positioned adjacent the wheel, a brake shoe housing, means perpendicular to the axis of the wheel pivotally mounting the brake shoe housing on said flange, said brake shoe housing being bifurcated such that it straddles the disk, a pair of brake shoes in said housing positioned one on each side of said disk and engageable with the disk, a piston in the housing bearing against each of said brake shoes, said brake shoe housing having a duct therein extending to one side of each of said pistons, and a hydraulic hose extending to said duct to conduct pressure fluid to the pistons to press the pistons against the brake shoes, a hydraulic actuator cylinder into which hydraulic fluid under pressure passes, said hose extending from the outlet end of said hydraulic actuator cylinder, and means in the hydraulic actuator cylinder to create a partial vacuum in said hose when pressure in said hydraulic actuator cylinder is reduced.

6. A disk brake for the wheels of a vehicle, comprising a disk, a plurality of spaced lugs on the rim of the wheel, said disk being bolted to the lugs, a nonrotatable flange positioned adjacent the wheel, a brake shoe housing, means perpendicular to the axis of the wheel pivotally mounting the brake shoe housing on said flange, said brake shoe housing being bifurcated such that it straddles the disk, a pair of brake shoes in said housing positioned one on each side of said disk and engageable with the disk, a piston in the housing bearing against each of said brake shoes, said brake shoe housing having a duct therein extending to one side of each of said pistons, and a hydraulic hose extending to said duct to conduct pressure fluid to the pistons and press the pistons against the brake shoes, a hydraulic actuator cylinder into which hydraulic fluid under pressure passes, said hose extending from the outlet end of said hydraulic actuator cylinder, and means in the hydraulic actuator cylinder to create a partial vacuum in said hose when pressure in said hydraulic actuator cylinder is reduced.

References Cited in the file of this patent

UNITED STATES PATENTS

| | | |
|---|---|---|
| 1,569,143 | Robinson | Jan. 12, 1926 |
| 2,385,625 | Hopmans | Sept. 25, 1945 |
| 2,485,032 | Bryant | Oct. 18, 1949 |
| 2,827,132 | Buyze | Mar. 18, 1958 |
| 2,934,173 | Butler et al. | Apr. 26, 1960 |
| 3,047,098 | Olley | July 31, 1962 |

FOREIGN PATENTS

| | | |
|---|---|---|
| 536,824 | Canada | Feb. 5, 1957 |
| 774,700 | Great Britain | May 15, 1957 |
| 801,805 | Great Britain | Sept. 24, 1958 |